United States Patent [19]

Randmae

[11] Patent Number: 5,611,558
[45] Date of Patent: Mar. 18, 1997

[54] SOUND PRODUCING ACCESSORY FOR BICYCLES

[75] Inventor: Rein S. Randmae, Fort Salonga, N.Y.

[73] Assignee: Carole Paar, Huntington, N.Y.

[21] Appl. No.: 503,310

[22] Filed: Jul. 17, 1995

[51] Int. Cl.⁶ ........................................... A63H 5/00
[52] U.S. Cl. ........................ 280/288.4; 446/404
[58] Field of Search ................... 280/288.4, 304.2; 446/397, 404, 409, 415

[56] References Cited

U.S. PATENT DOCUMENTS

| | | | |
|---|---|---|---|
| 2,557,263 | 6/1951 | Davis | 280/288.4 X |
| 2,624,156 | 1/1953 | Meyer | 446/404 |
| 2,633,097 | 3/1953 | Frew | 116/56 |
| 2,667,720 | 2/1954 | Connell, Jr. | 446/404 |
| 2,736,136 | 2/1956 | Modlin | 446/404 |
| 2,768,474 | 10/1956 | Harvey | 446/404 |
| 2,894,357 | 7/1959 | Munro | 446/404 |
| 2,940,215 | 6/1960 | Munro | 446/404 |
| 3,210,889 | 10/1965 | Lyman | 446/404 |
| 3,684,347 | 8/1972 | Challe et al. | 280/288.4 X |
| 3,827,178 | 8/1974 | Warneke | 446/404 |
| 3,905,151 | 9/1975 | Sweigle | 446/404 |
| 4,018,450 | 4/1977 | Rutledge | 280/288.4 |
| 4,151,677 | 5/1979 | Tucker | 446/404 |
| 4,828,151 | 5/1989 | Goss | 280/288.4 X |
| 5,226,846 | 7/1993 | Onori | 446/404 |

FOREIGN PATENT DOCUMENTS 145825  6/1954  Sweden ............... 446/404

*Primary Examiner*—Kevin Hurley

[57] ABSTRACT

An accessory for bicycles or tricycles for producing a motorcycle-like sound appealing to youngsters. The device being constructed of a strip of relatively hard but flexible material formed into a shape having: a flat region (32) engaging the spokes of the bicycle wheel; an "S" shaped region (28) providing flexibility thereby allowing the flat region to move as the spokes impinge on it; a semi-tubular region (30) lined with a hook type fastener material for attaching to a fork element of the bicycle; and a handle (34) as an aid for spreading apart the semi-tubular region to attach the accessory to the fork element.

20 Claims, 2 Drawing Sheets

5,611,558

SOUND PRODUCING ACCESSORY FOR BICYCLES

BACKGROUND—FIELD OF INVENTION

This invention relates to accessories for bicycles, specifically to a sound producing device attached to the wheel fork of a bicycle which in engagement with the spokes of the bicycle wheel produces a motorcycle-like clicking or rumbling sound.

BACKGROUND—DESCRIPTION OF PRIOR ART

Many accessories for bicycles have been devised for producing the familiar motorcycle-like clicking sound. An object such as a stick of wood, a firm piece of cardboard or resilient plastic is typically inserted into the path of the spokes of a bicycle wheel to produce such sounds. Youngsters find these devices very appealing, allowing them to imagine that they are actually riding a motorcycle or a similar motor driven vehicle rather than a bicycle.

Some of these devices have been relatively complex involving several moving parts or complex structure such as L. A. Harvey, Hotor-Simulating Device for Cycles, U.S. Pat. No. 2,768,474 (1956) or J. H. Lyman, Simulated Engine for Bicycles, U.S. Pat. No. 3,210,889 (1965). Other sound producing devices have been simple to manufacture but have not been easy to attach to the bicycle by a young child, requiring the ability to use tools, as cited in Rutledge, Bicycle-Mounted Noise Maker, U.S. Pat. No. 4,018,450 (1977), or requiring the dexterity to handle loose hardware for mounting, such as in E. B. Meyer, Jr, Velocipede Accessory for Producing Noise, U.S. Pat. No. 2,624,156 (1953). A further disadvantage in prior art has been a relatively short lifespan of the sound producing element which requires more than 25,000 flexure cycles for each mile traveled of an ordinary bicycle, as the element impacts the spokes of the wheel.

Further disadvantages are noted when accounting for changes which have taken place in the construction of bicycles in recent years. Some existing prior art noise making devices such as in D. C. Munro, Noise Making Device for Velocipedes Or The Like, U.S. Pat. No. 2,940,215 (1960) and Rutledge rely on wheel fender braces for mounting the device, but fenders with their attaching braces are virtually nonexistent today. Also, the recent popularity of "mountain biking" has brought changes to the front wheel forks of the bicycle. The fork elements on some bicycles are now round rather than oval in cross section and may be quite large in diameter. Thus any sound producing device must be securely mountable to a wide range of front or rear wheel fork element sizes and cannot rely on wheel fender supports for attachment. The device must also resist the tendency to rotate around the tubular wheel fork element as the spokes impact on it.

OBJECTS AND ADVANTAGES

It is therefore an object of this invention to provide a sound producing accessory for bicycles mountable to a wheel fork of a bicycle which overcomes the disadvantages of the prior art and produces in cooperation with the spoked wheel of the bicycle a motorcycle-like sound appealing to youngsters.

It is a further object of this invention to provide a sound producing accessory for bicycles which is inexpensive to manufacture, is basically of one piece construction having no moving parts, and which may be injection molded or profile extruded in plastic for volume production.

It is a further object of this invention to provide a sound producing accessory for bicycles which may be easily and safely mounted to or dismounted from the bicycle even by young children without the use of tools or loose hardware.

It is a further object of this invention to provide a sound producing accessory for bicycles which is securely mounted to the bicycle wheel fork, resisting rotation of the device as the spokes of the wheel impinge upon it.

It is another object of this invention to provide a sound producing accessory for bicycles which is durable and resists breakage in use, providing a long service life without replacement.

It is yet another object of this invention to provide a sound producing accessory for bicycles which accommodates a variety of mounting positions on both front and rear wheel forks of bicycles as well as the front wheel forks of tricycles and which will accept a wide variation of fork element diameters and configurations as found in recent designs of children's bicycles and tricycles.

Further objects and advantages of the invention will become apparent from the following Description of the Preferred Embodiment, Description of Operation and the drawings.

Figure 1:
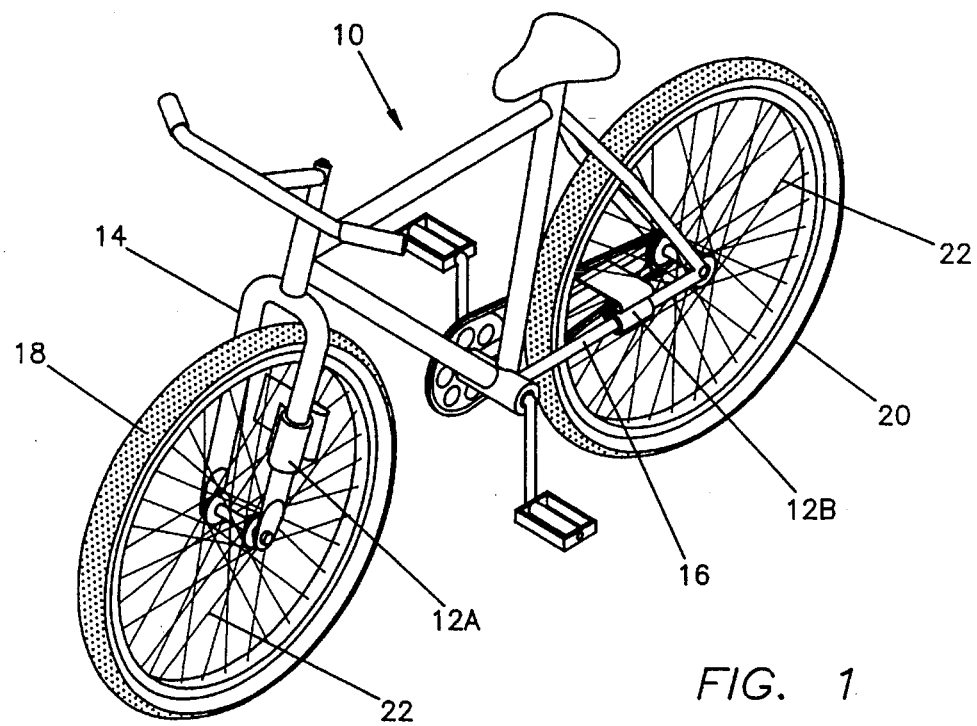
FIG. 1 is a general perspective view of a bicycle showing the sound producing accessory mounted alternatively on a left front fork element or a horizontal left rear fork element.

| Reference Numerals in Drawings | |
| --- | --- |
| 10 bicycle | 22 wheel spokes |
| 12 sound producing accessory in general | 24 loop fastener |
| | 26 hook fastener |
| 12A sound producing accessory mounted at a front fork | 28 "S" shaped region |
| | 30 semi-tubular region |
| 12B sound producing accessory mounted at a horizontal rear fork | 32 blade |
| | 34 handle |
| | 36 semi-rectangular section |
| 14 front wheel fork element | 38 alternate blade |
| 16 rear wheel horizontal | 40 large diameter wheel fork |

-continued

Reference Numerals in Drawings

| | |
|---|---|
| 18 fork element | 42 top handle |
| 18 front wheel | 44 convoluted, flexible region |
| 20 rear wheel | |

DESCRIPTION OF THE PREFERRED EMBODIMENT

The sound producing accessory is constructed of a flat strip of thin, flexible plastic material. The stiffness of the material is such that it can be bent easily by hand but is stiff enough to emit a snappy sound when it is impacted by the spokes of the bicycle wheel. Typically, the strip of material is approximately 50 millimeters (2 inches) wide and 0.76 (0.030) to 1.52 millimeters (0.060 inches) thick and preferably made from a durable plastic such as polypropylene, high density polyethylene or polyester to withstand constant flexing over a long period of time. However, other materials such as nylons, acetals, polycarbonate, vinyl, polystyrene, laminated fibrous materials or various plasticized materials, cardboard, paper, etc. could be utilized for its construction.

Figure 2:
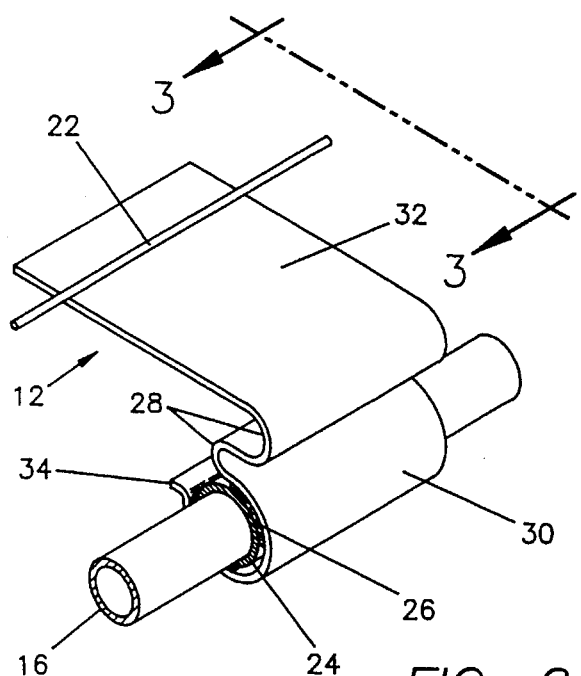
FIG. 2 is a view in detail showing the accessory as mounted on the horizontal left rear fork element of the bicycle.

FIGS. 1 and 2 show a typical embodiment of a sound producing accessory 12 attached to a horizontal rear fork element 16 of a bicycle 10 at 12B on FIG. 1 and generally at 12 on FIG. 2. The sound producing accessory 12 is constructed of a single piece of material but consists of four functionally different regions. A flat region or blade 32 approximately 57 millimeters (2¼ inches) long is the sound producing, vibrating member. It is joined to an "S" shaped region 28 having at least two oppositely directed bends which provide additional flexibility for a long usable life. The "S" shaped region 28 is adjacent to a semi-tubular region 30 which is formed into a diameter of about 19 millimeters (3/4 inch) for the purpose of attaching to fork element 16 on bicycle 10. The continuation of tubular region 30 as it wraps around fork element 16 is bent outward slightly at the end to form a handle $4 to aid in attaching or detaching device 12 from bicycle 10.

Figure 3:
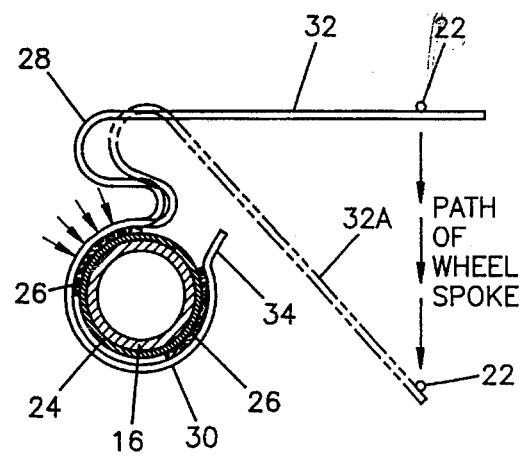
FIG. 3 is an end view of the accessory indicated by the lines 3—3 in FIG. 2.

The inside surface of semi-tubular region 30 is lined with hook fastener strips 26 generally known as Velcro brand, available from Velcro U.S.A. Inc. of Manchester, N.H. or the like. The bicycle fork 16 is wrapped with adhesive backed loop fastener material 24 at the location where the sound producing device 12 is to be attached. This is also known as Velcro brand and supplied as a mate to hook fastener material 26. Loop fastener material 24 should preferably be about the same width as the with of sound producing device 12 and be applied continuously around bicycle fork member 16, however hook fastener 26 may be applied in at least two strips across the width of semi-tubular region 30 as illustrated in FIG. 2 and FIG. 3.

Figure 4:
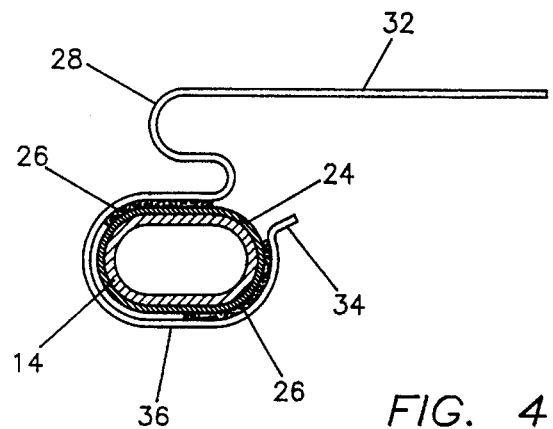
FIG. 4 is an end view of an alternate, more elongated configuration of the accessory mounted on a front fork element having an oval cross sectional area.
Figure 5:
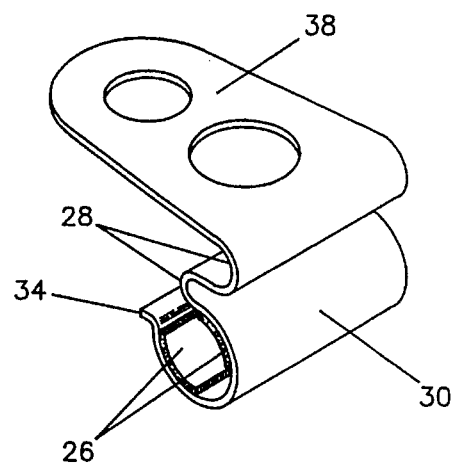
FIG. 5 shows another configuration of the sound producing accessory, unmounted from the bicycle, having a sound making blade with tapered edges and a rounded end, and also having holes through it.

Additional embodiments are shown in FIGS. 4 and 5; in FIG. 4 semi-tubular region 30 has been replaced by a semi-oval region 36 to suit an oval front wheel fork cross section 14. As seen from this example, the semi-tubular region 30 can assume various shapes to adapt to different or unusual cross-sectional shapes of wheel fork elements, if required.

In FIG. 5 the rectangularly shaped blade 32 has been modified to a tongue shaped blade 38 with angular sides and a rounded end. It also is shown with holes punched through it. Many other possibilities exist in varying the width, length and shape of the blade 32 to alter the sound characteristics of the device as well as its visual appeal.

Figure 7:
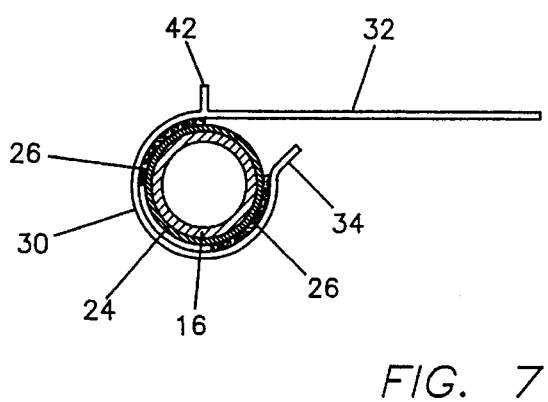
FIG. 7 and FIG. 8 are end views showing other embodiments of the sound producing accessory.

The "S" shaped region 28 may be altered in that the number of convolutions may be varied or eliminated entirely. One such embodiment is shown in FIG. 7 where semi-tubular region 30 is joined directly to flat region 32 without the intervening "S" shaped region 28. An additional top handle 42 has been added for convenience of installing the device on the bicycle. This type of configuration, without the "S" shaped region 28 is limited to a very few flexible materials such as polypropylene to achieve an acceptable product life. Handle 34 may also be altered in shape, angle of protrusion or it may he eliminated entirely with consequences which will become obvious from the following Description of Operation.

Figure 8:
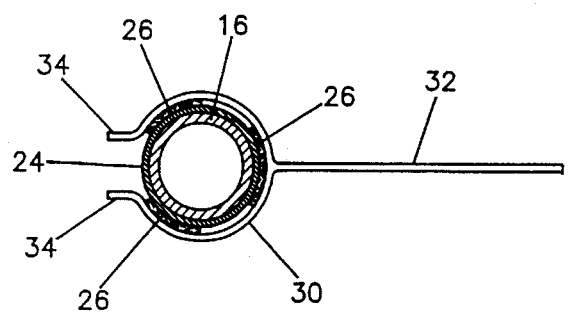
Figure 9:
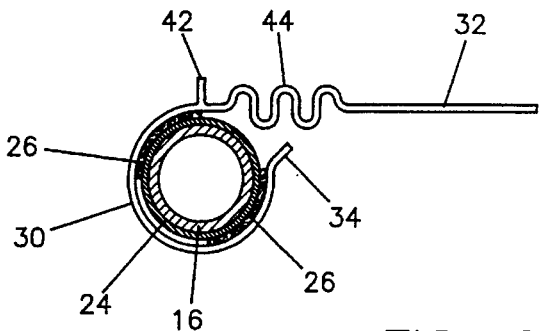
FIG. 9 is an end view showing a convoluted region of the blade in place of an "S" shaped region.

Another embodiment is shown in FIG. 8 where blade 32 is centrally located on semi-tubular region 30 and where two centrally located handles 34 and three strips of hook fastener 26 are provided. A further embodiment is shown in FIG. 9 where the "S" shaped region 28 has been replaced by a convoluted region 44 having at least two oppositely directed bends. The device may be constructed of various colored materials, including fluorescent or luminescent shades and it may be adorned by colorful labels to make the product more appealing to youngsters.

DESCRIPTION OF OPERATION

FIG. 1 illustrates sound producing accessory 12 attached to bicycle 10 in two alternate locations; front fork location at 12A and horizontal rear fork location at 12B. The locations illustrated are on the left side of the bicycle, however, the right side of the bicycle may he used as well, provided that accessory 12 in its preferred embodiment shown in FIGS. 2 and 3 is mounted in such a way that spokes 22 always approach blade from above, as indicated by three long arrows in FIG. 3, to deflect blade 32 to a position shown at S2A.

To install sound producing accessory 12 on bicycle 10, select a convenient location on one of the wheel forks, observing that the spokes 22 in the circumferential path of blade 32 will not contain other spoke mounted accessories such as reflectors etc. which may impact blade 32 as the wheels 18 and 20 rotate. Apply self-adhesive backed loop fastener 24 completely around the fork element and cut off excess. Grasp the width of the device at "S" bend 28 with one hand and handle 34 with the other hand and spread semi-tubular region 30 enough to pass over a front fork element 14 or a rear fork element 16. Position blade 32 at approximately right angle to the path of wheel spokes 22 so that blade 32 is in a direct path of spokes 22 and press hook fasteners 26 in contact with mating loop fastener 24.

As bicycle wheel 20 (FIG. 1) rotates, each spoke 22 deflects blade 32 to position 32A, shown in FIG. 3, before the blade 32 snaps back and impacts the next approaching spoke. The impact produces the characteristic slapping or rumbling sound as the wheel rotates. "S" bend region 28 provides the necessary flexibility and distributes stresses induced by the repetitive flexing to a much greater area thereby greatly increasing the usable lifetime of the device.

Figure 6:
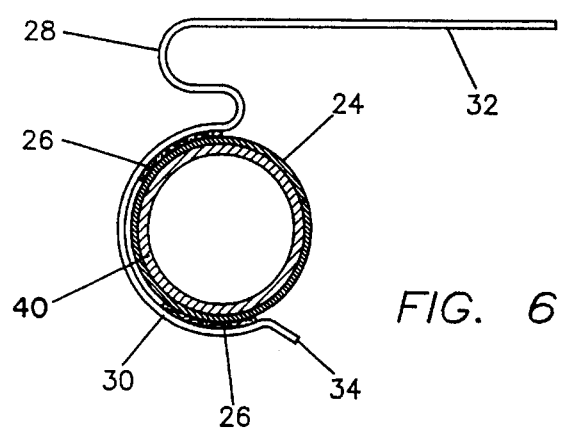
FIG. 6 is an end view of the accessory showing it spread open to enable mounting on a large diameter wheel fork element.

When blade 32 flexes, it imparts a force to the adjoining area of semi-tubular region 30. This force is directed inward as shown by the four short arrows in FIG. 3 and causes hook and loop fasteners 24 and 26 to engage more deeply, resisting rotation around circularly shaped wheel fork element 18. Due to the flexibility and springiness of the material, the semi-tubular region 30 may he opened to at least a diameter of 8 millimeters (1½ inches). FIG. 6 shows the device spread open and mounted to a large diameter wheel fork 40, whereas FIG. 4 illustrates attachment to an oval front wheel fork 14. Thus FIGS. 4 and 6 show that the sound producing device may be installed on a variety of bicycle wheel fork sizes and configurations. Other embodiments of the sound producing accessory are shown in FIGS. 5, 7, 8 and 9. FIG. 5 illustrates a tongue-shaped rounded end blade 38 with optional holes through it. The shape of the blade and the holes alter the quality, or timber, of the sound produced. Many different sizes and shapes of the sound producing blade are possible. FIG. 7 shows an embodiment which omits "S" shaped region 28. In this configuration of the device, a second handle 42 is added at the top surface of blade 32 to aid installation. FIG. 8 shows another embodiment which is of symmetrical design and can thus be installed in identical fashion on either right or left side of bicycle 10 without regard to the direction of travel of spokes 22. The convoluted region 44 shown in FIG. 9 is an alternate means of providing flexibility to blade 32 for a long use life of the product.

SUMMARY, RAMIFICATIONS AND SCOPE

It is evident that the sound producing accessory described may be easily attached to or detached from a bicycle by even very young children. The construction of the device is such that a child need not use any tools nor need additional articles of hardware, to securely install the device. The device will not loosen or detach itself during use. Furthermore, the fingers of the installer need not be near the spokes of the wheel while attaching the device, in its preferred embodiment, to the bicycle, thus the installation is safe. The device may be attached to a variety of bicycle wheel fork sizes and configurations at several locations on the bicycle frame, including a vertical rear fork location (not shown). The accessory will in its preferred embodiment have an almost unlimited life, providing many hours of a motorcycle-like sound to the amusement of youngsters. The accessory may be inexpensively produced in volume by using well established plastic processing techniques such as heat forming, profile extrusion, or injection molding.

While the above description contains many specific features of the invention, these should not be construed as limitations on the scope of the invention, but rather as an exemplification of one preferred embodiment thereof. Many other variations are possible, for example, the width, length or shape of the blade 32 may be altered to assume a configuration which is triangular, elliptical, trapezoidal, rounded etc. The "S" shaped region 28 may be altered to have larger or smaller bend radii, or the convolutions may be longer or shorter; the number of them may be increased to three, four, five, or more. Semi-tubular region 30 may be larger or smaller in diameter, or assume oval, rectangular, triangular, or any other shape. Handle 34 may have a shallow or a sharper bend or be eliminated entirely. The strips of hook and loop fasteners 24 and 26 may be longer, shorter, wider, narrower or have any other convenient shape, or they may have their positions reversed, loop fastener 24 replacing hook fastener 26 and vice versa. The hook and loop fasteners 24 and 26 may be replaced by other methods of attachment such as adhesives, double-sided adhesive tape, etc. which will serve to attach the accessory securely to the bicycle. The cross sectional area of the strip of material that the accessory is made of may be uniformly thin and rectangular, or tapered to suit the manufacturing process used. Color, material, texture, etc. may be changed to suit any particular taste, and labeling may be added to enhance appearance. Accordingly, the scope of the invention should be determined not by the embodiments illustrated, but by the appended claims and their legal equivalents.

I claim:

1. A sound producing accessory for bicycles having spoked wheels comprising a strip of flexible material much greater in width than its thickness formed into a shape having:

(a) a substantially flat region which in cooperation with the spokes of the wheel produces a slapping or rumbling sound, (b) a semi-tubular region adjacent and directly joined to said flat region, said semi-tubular region having an opening at an area of its circumference, (c) said semi-tubular region having a liner on the inner surface thereof, said liner providing fastening means, whereby said sound producing accessory may be attached to a frame element of the bicycle, such that said flat region lies in a direct path of the wheel spokes.

2. The sound producing accessory of claim 1, further including an "S" shaped region between said flat region and said semi-tubular region thereby providing flexibility such that said flat region may deflect when impacted by the wheel spokes.

3. The sound producing accessory of claim 2, further including at least a singular protrusion formed at the end of said semi-tubular region extending generally radially outward therefrom whereby said semi-tubular region may be grasped and spread open for ease of installing on said frame element.

4. The sound producing accessory of claim 1, further including at least a singular protrusion formed on the outer surface of said semi-tubular region extending generally radially outward therefrom whereby said semi-tubular region may be grasped and spread open for ease of installing on said frame element.

5. The sound producing accessory of claim 1, further including a convoluted region having at least two bends between said flat region and said semi-tubular region thereby providing flexibility such that said flat region may deflect when impacted by the wheel spokes.

6. The sound producing accessory of claim 1, wherein said semi-tubular region is tangentially joined to said flat region.

7. The sound producing accessory of claim 1, wherein said flat region is joined to said semi-tubular region at its circumferential center, extending radially outward therefrom.

8. The sound producing accessory of claim 7, further including a multiplicity of protrusions locatable opposite to the juncture of said flat region with said semi-tubular region, extending generally radially outward therefrom.

9. The sound producing accessory of claim 1, wherein said flat region has means for altering the sound characteristics of the accessory.

10. The sound producing accessory of claim 1, wherein said semi-tubular region incorporates means for conforming to the cross sectional shape of the frame element of the bicycle.

11. The sound producing accessory of claim 1, wherein said strip of material is composed of a thermoplastic.

12. A sound producing accessory for bicycles having spoked wheels comprising a strip of thin, flexible material of reasonable width having a series of bends along its shorter dimension to form said strip into a shape having:

(a) a substantially flat region which, when inserted into the path of the spokes of the bicycle wheel, emits a slapping or rumbling sound, (b) a circularly shaped semi-tubular region directly attached to said flat region, said semi-tubular region encompassing at least a part of the circumference of a circle, (c) a lining situated on the inner surface of said semi-tubular region, said lining having adhesive properties, whereby said sound producing accessory may be attached to a frame element of the bicycle, such that said flat region lies in a direct path of the wheel spokes.

13. The sound producing accessory of claim 12, wherein said semi-tubular region is tangentially joined to said flat region.

14. The sound producing accessory of claim 13, including at least a singular protrusion formed on the outer surface of said semi-tubular region extending generally radially outward therefrom whereby said semi-tubular region may be grasped and spread open for ease of installing on said frame element.

15. The sound producing accessory of claim 14, further including a convoluted region having at least two bends between said flat region and said semi-tubular region thereby providing flexibility such that said flat region may deflect when impacted by the wheel spokes.

16. The sound producing accessory of claim 12, wherein said flat region has means for altering the sound characteristics of the accessory.

17. The sound producing accessory of claim 12, wherein said semi-tubular region incorporates means for conforming to the cross sectional shape of the frame element of the bicycle.

18. The sound producing accessory of claim 12, wherein said strip of material is composed of a thermoplastic.

19. The sound producing accessory of claim 12, further including an "S" shaped region between said flat region and said semi-tubular region thereby providing flexibility such that said flat region may deflect when impacted by the wheel spokes.

20. The sound producing accessory of claim 19, further including at least a singular protrusion formed at the end of said semi-tubular region extending generally radially outward therefrom whereby said semi-tubular region may be grasped and spread open for ease of installing on said frame element.

* * * * *